United States Patent [19]

Barbour

[11] Patent Number: 5,100,370
[45] Date of Patent: Mar. 31, 1992

[54] APPARATUS FOR CUFFING BAGS IN CARTONS

[75] Inventor: Tom J. Barbour, Spokane, Wash.

[73] Assignee: R. A. Pearson Company, Spokane, Wash.

[21] Appl. No.: 728,657

[22] Filed: Jul. 11, 1991

[51] Int. Cl.⁵ .............................................. B31B 7/74
[52] U.S. Cl. ..................................... 493/100; 53/175; 493/294; 493/907
[58] Field of Search ............... 493/100, 217, 294, 907; 53/175, 371.2, 371.3

[56] References Cited

U.S. PATENT DOCUMENTS

| | | |
|---|---|---|
| 3,606,821 | 9/1971 | Tsien . |
| 3,796,140 | 3/1974 | Adams et al. ............................ 93/32 |
| 4,083,293 | 4/1978 | Goldstein ............................ 493/100 |
| 4,142,453 | 3/1979 | Gidewall et al. ................... 93/36.01 |
| 4,522,012 | 6/1985 | Nelson ................................ 53/175 |
| 4,687,462 | 8/1987 | Rewitzer ............................ 493/100 |
| 4,729,209 | 3/1988 | Owensby et al. ..................... 53/434 |
| 4,829,741 | 5/1989 | Langen ................................ 53/175 |

FOREIGN PATENT DOCUMENTS 1242225 12/1960 France ................................. 53/175

Primary Examiner—Bruce M. Kisliuk
Assistant Examiner—Jack Lavinder
Attorney, Agent, or Firm—Wells, St. John & Roberts

[57] ABSTRACT

A cuffing assembly for flexible bags inserted into a receiving open carton includes paired cuffing fingers that span each carton corner. The fingers are movable between a retracted position for insertion into a bag and an extended position in which they can overlap the outer surfaces adjacent to each carton corner. Diagonal clamp forces can be applied to the cuffed bag between the fingers of each pair as required.

13 Claims, 4 Drawing Sheets

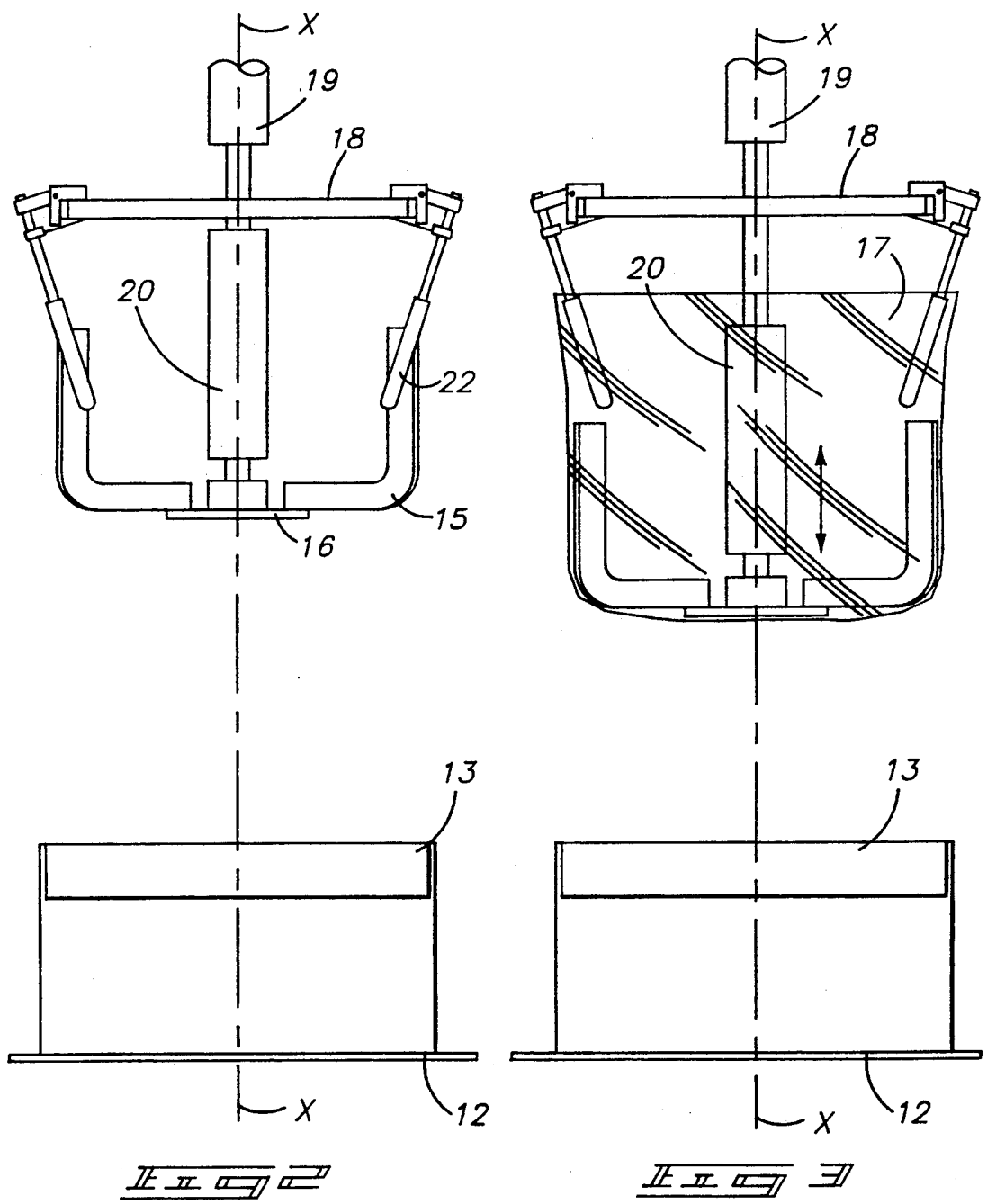

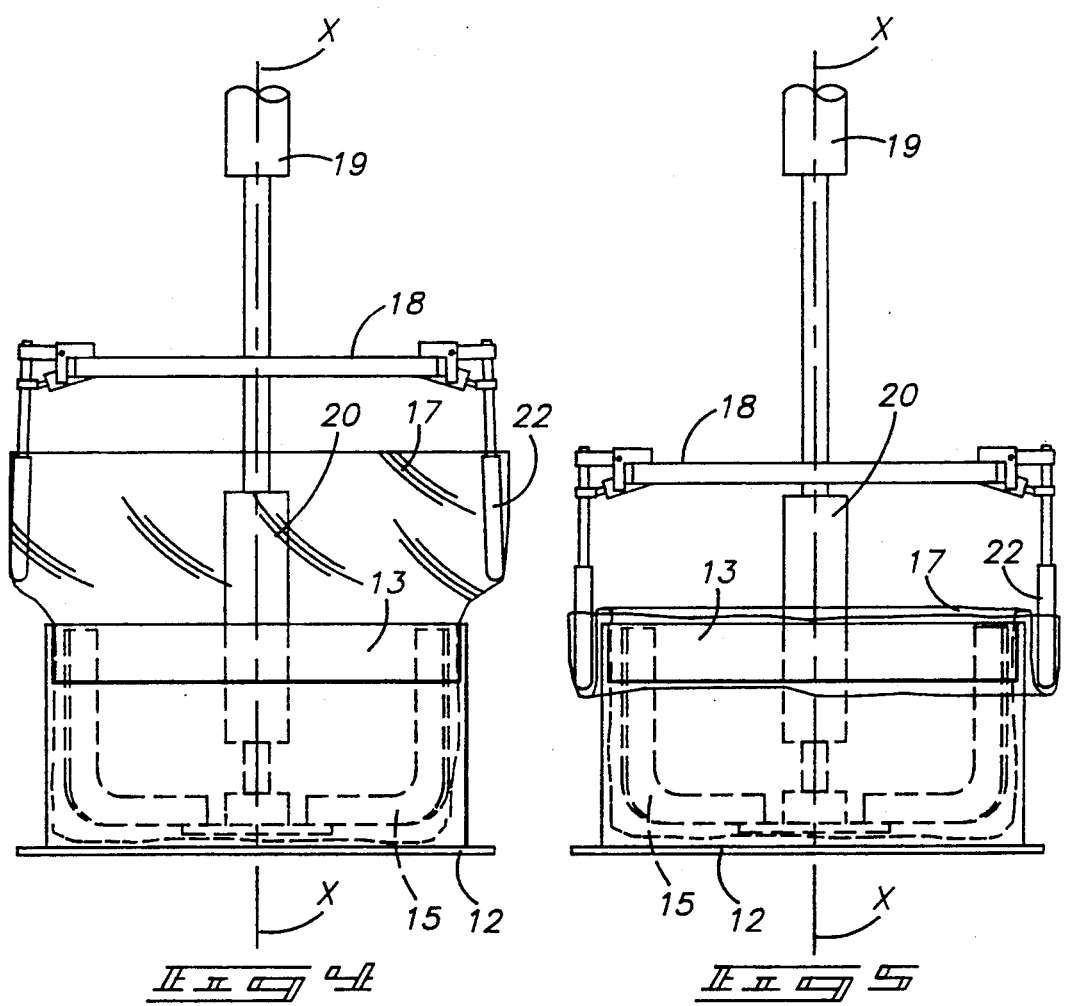

APPARATUS FOR CUFFING BAGS IN CARTONS

TECHNICAL FIELD

This disclosure pertains to machinery for expanding and inserting empty flexible bags into an open carton. It specifically pertains to a mechanism for cuffing an open end of a bag about an open carton periphery.

BACKGROUND OF THE INVENTION

This invention arose from a need to effectively automate the lining of cartons by insertion of an open plastic bag. Such lined carton assemblies are widely used for packing of fresh meat and other food products.

Examples of prior patents disclosing equipment for inserting and cuffing plastic bags in a carton assembly are shown in U.S. Pat. Nos. 4,142,453 to Gidewall et al., 4,522,012 to Nelson and 4,729,209 to Owensby et al.

The Gidewall et al. patent discloses equipment in which individual plastic bags are manually placed about a mandrel prior to insertion. Cuffing is accomplished by pivoting folder assemblies 120, illustrated as opposed plates 128 that are each wider than the inserting mandrel. A diagrammatic illustration of these plates is shown in FIG. 7 of the patent drawings, where the folder plates are indicated by numeral 30, the cuffed opening of the bag is illustrated at 31, and the receiving carton is illustrated at 32.

The Nelson patent removes individual bags from a supply roll as the inserting mandrel moves downwardly toward the receiving carton. Four cuffing fingers 125 spread the open mouth of each bag for cuffing purposes. The cuffing fingers extend at about a 45° angle relative to each corner of the receiving carton. This type of cuffing arrangement is diagrammatically illustrated in FIG. 6, where the fingers are designated by the numeral 33, the cuffed portion of the bag is designated at 34 and the carton is indicated at 35.

The Owensby patent discloses use of downwardly depending fingers which act as spreader means and means to hold the upper portion of the bag, which is supplied from a stack. The fingers are carried on the inserting mandrel and the spreading function is provided by an activating mechanism 17. The linkage 17 moves the spreader fingers outwardly to spread out the mouth of the bag and to form a cuff about the outer perimeter of the box. No details are provided with respect to the fingers, which is part of an outer mandrel shown at 10 in the referenced patent disclosure. It appears from the patent description that the spread fingers assume the positions shown in FIG. 6 of the drawings submitted with this disclosure.

Similar cuffing mechanisms have been described in prior patents pertaining to related equipment for cuffing plastic bags in a nested configuration. Four cuffing bars located at four corners of a support plate are described in U.S. Pat. No. 3,606,821 to Tsien. Four cuffing fingers are also illustrated and described in U.S. Pat. No. 3,796,140 to Adams et al., and are diagrammatically shown as items 66–69 in FIG. 7 of the drawings for that patent.

So far as can be determined, all of the spreading and cuffing mechanisms that have preceded the present invention have required that the bag be spread diagonally outward beyond each corner of the receiving carton. Since the spreading fingers or bars have a thickness that must be accommodated during the cuffing operation, this requires that the dimensions of the bag being inserted into a carton be somewhat greater than the interior carton dimensions. It is not practical to substantially stretch the plastic material of the bag for the cuffing procedures. This would either deform or tear the mouth of the bag or would result in frictional forces being developed against the spreading elements to a degree that would impede their subsequent removal from the cuffed opening.

Another difficulty with previously-known cuffing mechanisms is the inability to grip or hold the bag during removal of the mandrel and spreading elements. Any inward pressure exerted on the cuffed portions of the bags between the corner spreading elements will greatly increase the frictional engagement between the cuffed bag and spreading elements.

The present improvement permits substantial reductions to be made in the size of inserted bags that are cuffed over a receiving carton. It also facilitates use of selective clamping forces to engage the exterior of the cuffed bag opening and thereby assist in the removal of spreading fingers from within the bag without pulling the bag with them.

BRIEF DESCRIPTION OF THE DRAWINGS

One or more preferred embodiments of the invention are illustrated in the accompanying drawings, which are briefly described below.

FIG. 2 is a diagrammatic elevation view showing the elements of the invention prior to receipt of a bag;

FIG. 3 is a view similar to FIG. 2, showing initial engagement of a bag by the mandrel and retracted fingers;

FIG. 4 is a view similar to FIG. 2, showing the mandrel inserted into the receiving carton and the bag opening being spread by the extended fingers;

FIG. 5 is a view similar to FIG. 2, showing completion of the cuffing operation;

DETAILED DESCRIPTION OF THE PREFERRED EMBODIMENTS

This disclosure of the invention is submitted in furtherance of the constitutional purposes of the Patent Laws "to promote the progress of science and useful arts" (Article 1, Section 8).

The present improvement can be utilized in a variety of machines designed for inserting bags into open cartons. The present improvements pertain to the inserting mandrel assembly, as well as to an interrelated clamping mechanism for the cuffed portions of the bags. It is immaterial whether the bags are fed manually or by machine, from a flat stack, or from a roll. One familiar with the present development of bag inserter machinery, as generally illustrated by the U.S. patents reference above, will readily understand the application of the present improvements to such equipment.

Figure 1:
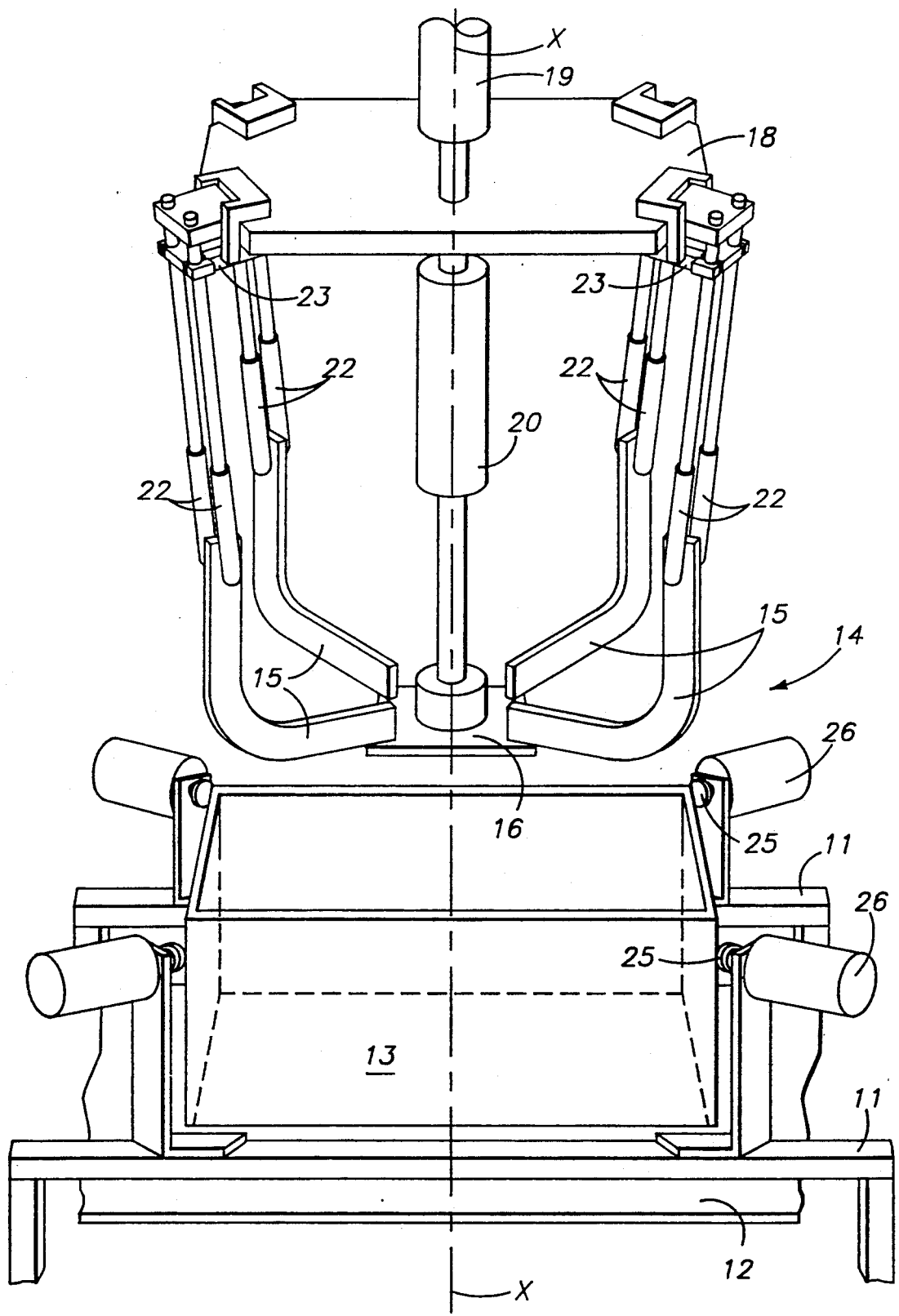
FIG. 1 is a simplified perspective view of the bag inserter elements modified according to the present invention.

This invention can best be understood from a review of the machine components shown in FIG. 1. The inserting and cuffing apparatus is mounted on a supporting machine framework. Incoming open cartons 13 are fed along framework 10 by a powered conveyor 12. They are guided between stationary rails 11 fixed to the framework.

Each open carton 13 is individually aligned in a stationary loading position facing a movable mandrel 14. The mandrel is insertable progressively into an open bag 17 and the facing open carton 13 axially aligned with the mandrel. After the bag reaches the bottom of the carton, the open end of the bag is cuffed about the perimeter of the open carton in preparation for loading of product.

Mandrel 14 is constructed from a plurality of diagonal plates 15 adapted to individually bisect the corners of a receiving carton 13. Each plate 15 includes an open vertical leg and an integral horizontal leg extending inwardly across the outer or bottom end of mandrel 14. The four plates illustrated in FIG. 1 are joined to one another at a central block 16 to form a unitary mandrel structure conforming to the shape and size of the interior surfaces of a receiving carton 13.

The open upper end of each bag 17 is cuffed about the carton by movable cuffing fingers 22 located axially inward from the mandrel 14. A pair of cuffing fingers 22 are provided along each corner of mandrel 14. Each pair of cuffing fingers 22 are arranged in diagonal side-by-side part to diagonally span one corner of a receiving carton 13. The individual cuffing fingers in each pair are arranged at opposite sides of the respective mandrel plates 15. They move inwardly and outwardly in directions parallel to the adjacent plates 15 as they pivot relative to axes perpendicular to the plates.

Actuating means is operably connected to each pair of cuffing fingers 22 for selectively moving the individual cuffing fingers between a retracted position and extended position. The actuating means is illustrated by small cylinders 23 connected by linkages to the paired fingers 22, which in turn are pivotally connected at their upper ends to a supporting movable frame 18. The retracted position is located within the exterior confines of mandrel 14 to facilitate initial placement of the mandrel 14 and cuffing fingers 22 within a receiving bag 17 in preparation for subsequent insertion of the bag 17 within a receiving carton 13. While in the extended position, each finger 22 overlaps an intersecting outer side wall of a receiving carton at locations adjacent to its corners. The extended position of each cuffing finger 22 spreads the open end of the bag 17 and inverts the open end of the bag over the top edges of the carton 13 as the bag 17 is inserted within it. The extended fingers 22 produce a surrounding "cuff" about the carton opening, with the upper edge of the bag 17 facing upwardly about the periphery of the extended fingers 17.

While powered actuators are shown for the fingers, it is to be understood that fingers 22 can alternately be moved inward and outward by mechanical mechanisms that operate in response to reciprocating movement imparted to the supporting frame 18. For instance, a cam follower (not shown) could be provided along each corner of frame 18 on the supporting framework 10. The cam, in the form of a vertical guide surface, could be engaged by a cam follower operably connected to each pair of fingers 22 to provide the movement previously described.

Frame 18 is vertically movable relative to framework 10 by means of a main cylinder 19 operably connected between them. The housing of cylinder 19 is fixed to framework 10. Its reciprocating piston is mounted to frame 18 at its lower end.

A secondary cylinder 20 is operably connected between frame 18 and mandrel 14. The upper end of the cylinder housing is fixed to the frame 18. The lower end of its piston rod is fixed to the center block 16 of mandrel 14. The entire inserting and cuffing assembly is centered along a mandrel axis illustrated in FIG. 1 by the line X—X.

As an accessory to the described fingers, movable clamp bars 25 can be mounted on the machine framework to engage the corners of bag 17 against the underlying corners of carton 13. The clamp bars are moved by clamp actuators, illustrated as small cylinders 26. The cylinders 26 are mounted to the fixed rails 11 that guide cartons 13 along conveyor 12. The actuators and clamp bars are oriented so as to move along axes that respectively bisect the individual corners of a carton 13 engaged by them.

Figure 7:
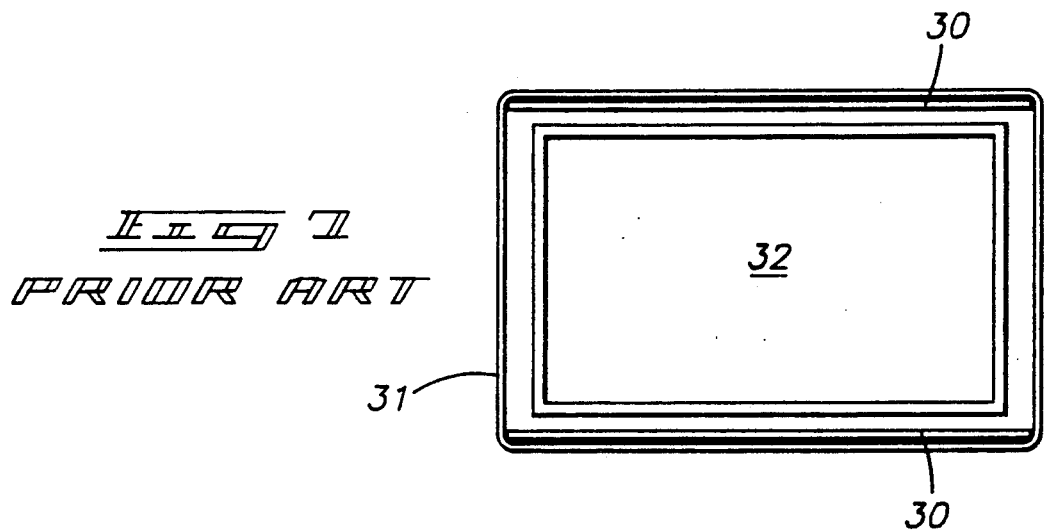
FIG. 7 is a view similar to FIG. 6, illustrating prior art use of opposed spreader plates.
Figure 8:
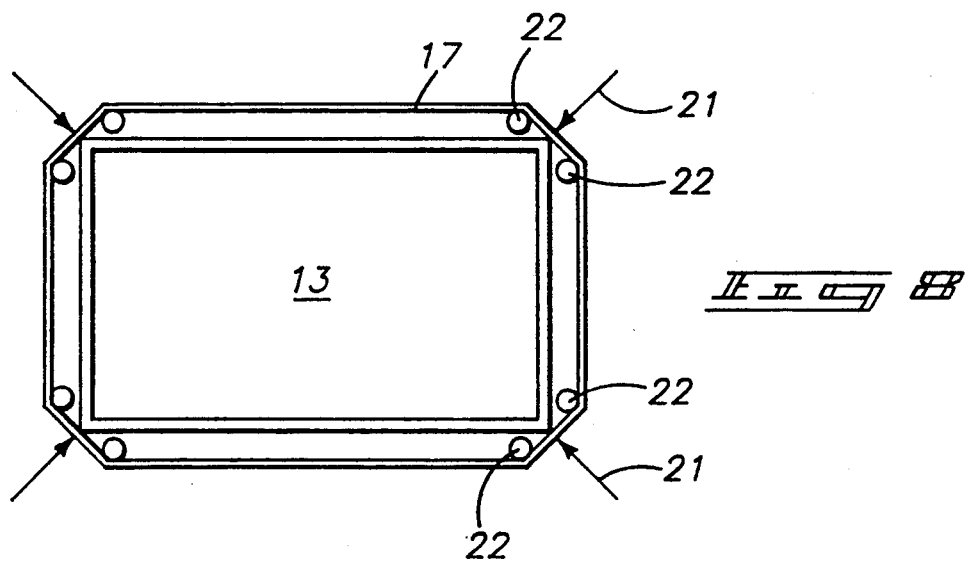
FIG. 8 is a similar diagrammatic view, illustrating use of the present invention.

FIG. 8 graphically illustrates the improved cuffing action achieved by the present invention. By allowing the bag 17 to diagonally span each corner of carton 13, this arrangement substantially reduces the overall size of a bag necessary for lining the carton 13. As an example, the plastic film used across a 3 inch corner in the manner shown in FIGS. 6 and 7 can be reduced to a diagonal lenght of film having a measurement of 2¼ inches, but spanning the same 3 inch corner. This ¾ inch saving of film, when multiplied by four corners, results in a total circumferential savings of 3 inches of material about the bag. In high production packaging installations, the economic benefits of saving this bag material is substantial.

The dual fingers provided at each corner also better support the film spanning each corner to eliminate the possibility of the cuff engaging the carton prematurely during cuff formation. The angle formed by the film across each finger is greater than 90°, thereby reducing the tendency of the film to wrinkle or catch on itself as it inverts under the fingers 22 to form a cuff at the exterior of the receiving carton.

Figure 6:
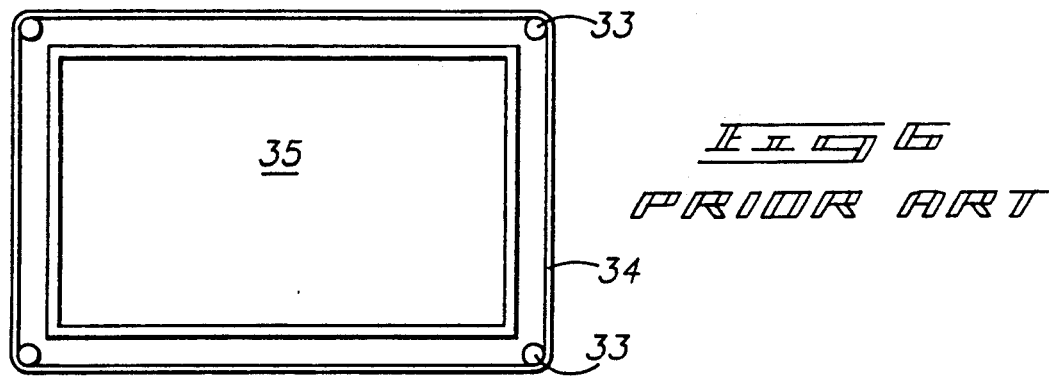
FIG. 6 is a diagrammatic plan view illustrating prior art use of corner fingers to spread and cuff a bag opening within a carton.

As can be seen in FIG. 8, the bag has twice as many supports as it would were each corner supported diagonally outward from the corner (FIG. 6).

Finally, the fact that the fingers 22 diagonally span each corner of the carton 13 permits application of clamping forces at the corners to retard upward movement of the cuff about the carton as the fingers 22 are retracted in an upward direction. These clamping forces are illustrated in FIG. 8 by arrows 21. The clamping forces can be applied by any suitable mechanism, such as the clamp bars 25 illustrated in FIG. 1. Where bags are cuffed by single fingers diagonally outward from each corner (FIG. 6), clamping forces cannot be applied to the cuffed opening without stretching the bag over the fingers. The stretching encountered by use of the present apparatus is very minimal because the cuffed film can be very close to the carton corner due to its adjacent support on the paired fingers 22.

The method of inserting and cuffing bags to line a rectangular carton according to this invention is diagrammatically illustrated in FIGS. 2-5.

FIG. 2 shows the above-described components in their initial positions prior to placement of a bag about the mandrel 14.

Operation of the apparatus is initiated by activating main cylinder 19 to lower the frame 18 and extended mandrel 14 downwardly, placing the mandrel 14 within an open bag 17 as it approaches the awaiting carton 13 on conveyor 12 (FIG. 3). During this movement, the lower ends of the fingers 22 slightly overlap the upper ends of the mandrel plates 15. The fingers 22 are in their retracted positions radially within the confines of the mandrel 14 and are located within the interior of bag 17.

FIG. 4 shows the bag 17 fully inserted within carton 13. When the bottom edges of mandrel 14 engage the bottom of the carton 13, the secondary cylinder 20 is actuated to retract its piston and shorten the distance between the bottom of mandrel 14 and the frame 18, which continues to move downwardly. When mandrel 14 reaches the bottom of carton 13, the actuator cylinders 23 are powered to pivot fingers 22 to their extended positions (parallel to axis X—X). In these positions, the fingers 22 are aligned outwardly along the outer surfaces of the carton sides.

FIG. 5 shows completion of the cuffing operation, which occurs as the four pairs of fingers 22 push downwardly along the opening of bag 17 to invert it over the top edges of the carton 13 and the bottom ends of the fingers 22.

After completion of the inserting and cuffing operations as shown in FIG. 5, the secondary cylinder 20 is expanded to remove fingers 22 from within the cuffed bag opening. They are then retracted. Diagonal clamping forces can be applied about the corners of the cuffed opening of bag 17 if desired or necessary in a particular installation to facilitate removal of the fingers 22. Main cylinder 19 is subsequently activated to remove mandrel 14 from within the lined carton 13.

The illustrated mandrel structure provides bisecting bag guides (diagonal plates 15) at the corners of the receiving carton 13, thereby assuring that the bag is fully opened and tucked into each corner. The mandrel and finger combination permits reduction in the circumference of a bag inserted and cuffed within the receiving carton. The greater control over the cuffing procedure provided by the paired fingers that diagonally span each carton corner improve operating efficiency of the machine and decrease bag costs by reducing the required bag size.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. An apparatus for cuffing the open end of a flexible bag over the top edges of a carton into which the bag is inserted as a liner, comprising:
    a mandrel insertable progressively into an open bag and a facing open carton axially aligned with the mandrel;
    a plurality of paired cuffing fingers arranged in diagonal side-by-side positions, each pair of cuffing fingers being adapted to diagonally span one corner of a receiving carton; and
    actuating means operably connected to each pair of cuffing fingers for selectively moving the paired cuffing fingers between a retracted position to facilitate initial placement of the mandrel and cuffing fingers within a bag in preparation for subsequent insertion of the bag within a receiving carton, and an extended position in which the cuffing fingers spread the open end of the bag and respectively overlap the intersecting outer side walls of a receiving carton at locations adjacent to one of its corners to thereby cause the bag to diagonally span each corner of the carton and invert the open end of the bag over the top edges of the carton as the bag is inserted within it.

2. The apparatus of claim 1 wherein the mandrel and cuffing fingers are mounted on a common frame;
    the apparatus further comprising:
    first actuating means for selectively imparting movement of the mandrel and cuffing fingers in relation to a receiving carton during initial insertion of a bag within the carton.

3. The apparatus of claim 1 wherein the mandrel and cuffing fingers are mounted on a common frame aligned along a mandrel axis;
    the apparatus further comprising:
    first actuating means for imparting movement of the mandrel and cuffing fingers in relation to a receiving carton during initial insertion of a bag within the carton; and
    second actuating means operably connected to the cuffing fingers for imparting relative motion between the mandrel and cuffing fingers in directions parallel to the mandrel axis.

4. The apparatus of claim 1 further comprising:
    movable clamping means for engaging the bag between the cuffing fingers in each pair for facilitating removal of the cuffing fingers from within the inserted bag.

5. An apparatus for lining a carton having a plurality of corners arranged about a peripheral opening by inserting a closed end of a flexible bag into the carton and cuffing an opposite open end of the bag over the carton opening in preparation for loading of the lined carton, comprising:
    a mandrel insertable into a flexible bag and engaging the interior of a closed end of the bag;
    carton positioning means for aligning individual open cartons with the mandrel;
    power means for guiding the mandrel and bag into an open carton during relative movement between the mandrel and carton along a reference axis;
    a plurality of paired cuffing fingers arranged in diagonal side-by-side positions and mounted adjacent to the mandrel, each pair of cuffing fingers being arranged to diagonally span one corner of a receiving carton; and
    actuating means operably connected to each pair of cuffing fingers for selectively moving the cuffing fingers between retracted positions to facilitate initial placement of the mandrel and cuffing fingers within a receiving bag in preparation for insertion of the bag within a receiving carton, and extended positions in which the cuffing fingers are adapted to spread the open end of the bag and respectively overlap intersecting outer side walls of a receiving carton at locations adjacent to each of its corners to cause the bag to diagonally span each corner of the carton and invert the open end of the bag over the top edges of the carton as the bag is inserted within it by reciprocation of the mandrel.

6. The apparatus of claim 5, wherein the mandrel comprises:

a plurality of axially plates adapted to individually bisect the corners of a receiving carton.

7. The apparatus of claim 5, wherein the mandrel comprises:
a plurality of diagonal plates adapted to individually bisect the corners of a receiving carton;
each pair of cuffing fingers being arranged at opposite sides of the respective plates.

8. The apparatus of claim 5, wherein the mandrel comprises:
four diagonal plates adapted to individually bisect the corners of a receiving carton, the four plates being joined across common ends to form a unitary structure conforming to the interior of a receiving carton.

9. The apparatus of claim 5, wherein the mandrel comprises:
four diagonal plates adapted to individually bisect the corners of a receiving carton, the four plates being joined across common ends to form a unitary structure conforming to the interior of a receiving carton;
the individual cuffing fingers of each pair being arranged at opposite sides of the respective plates.

10. The apparatus of claim 5 further comprising:
movable clamping means for engaging the bag between the cuffing fingers in each pair for facilitating removal of the cuffing fingers from within the inserted bag.

11. An apparatus for lining a rectangular carton having four corners arranged about a peripheral opening by inserting a closed end of a flexible bag into the carton and cuffing an opposite open end of the bag over the carton opening in preparation for loading of the lined carton, comprising:
a supporting framework;
a mandrel insertable into a flexible bag and engaging the interior of a closed end of the bag, the mandrel being guided on the framework for reciprocating motion along a mandrel axis and having four diagonal plates adapted to individually bisect the corners of a receiving carton, the four plates being joined across common ends to form a unitary structure conforming to the interior of a receiving carton;
carton positioning means on the framework for individually aligning open cartons in a loading position facing the mandrel;
power means operably connected between the mandrel and framework for shifting the mandrel and a surrounding bag into an open carton at the carton loading position;
a plurality of paired cuffing fingers mounted on the framework at positions adjacent to the mandrel, each pair of cuffing fingers being arranged in diagonal side-by-side positions at opposite sides of the respective plates of the mandrel to diagonally span one corner of a receiving carton; and
actuating means operably connected to each pair of cuffing fingers for selectively moving the cuffing fingers between retracted positions to facilitate initial placement of the mandrel and cuffing fingers within a receiving bag in preparation for insertion of the bag within a receiving carton, and extended positions in which the cuffing fingers are adapted to spread the open end of the bag and overlap opposite outer side walls of a receiving carton at locations adjacent to each of its corners to cause the bag to diagonally span each corner of the carton and invert the open end of the bag over the top edges of the carton as the bag is inserted within it by reciprocation of the mandrel.

12. A method for lining a rectangular carton having four corners arranged about a peripheral opening by inserting a closed end of a flexible bag into the carton and cuffing an opposite open end of the bag over the carton opening in preparation for loading of the lined carton, comprising the following steps:
inserting a mandrel into a flexible bag and engaging the interior of a closed end of the bag;
positioning an open carton in a loading position facing the mandrel;
shifting the mandrel and a surrounding bag into an open carton at the carton loading position; and
actuating a plurality of paired cuffing fingers arranged at opposite sides of each corner of a receiving carton to selectively move the cuffing fingers between retracted positions to facilitate initial placement of the mandrel and cuffing fingers within a receiving bag in preparation for insertion of the bag within a receiving carton, and extended positions in which the cuffing fingers are adapted to spread the open end of the bag and overlap opposite outer side walls of a receiving carton at locations adjacent to each of its corners and to invert the open end of the bag over the top edges of the carton as the bag is inserted within it by reciprocation of the mandrel.

13. The method of claim 12, comprising the following additional step:
engaging the bag between the cuffing fingers in each pair for facilitating removal of the cuffing fingers from within the inserted bag.

* * * * *